United States Patent [19]
DiGregorio et al.

[11] 4,275,020
[45] Jun. 23, 1981

[54] GAS-LIQUID DISSOLVING TANK

[75] Inventors: David DiGregorio; Daniel McCarthy; Keith J. Mounteer, all of Salt Lake City; Charles D. Thompson, Hunter, all of Utah

[73] Assignee: Envirotech Corporation, Menlo Park, Calif.

[21] Appl. No.: 944,116

[22] Filed: Sep. 20, 1978

[51] Int. Cl.³ ............................. B01F 3/04; C02F 1/24
[52] U.S. Cl. .................................. 261/111; 210/198.1; 261/115
[58] Field of Search ............... 55/90, 94, 159, 196, 55/223, 188, 257; 210/221 M, 221 P, 63, 198 R; 261/111, 113, 115, 118, DIG. 13

[56] References Cited

U.S. PATENT DOCUMENTS

| | | | |
|---|---|---|---|
| 1,100,307 | 6/1914 | Jackson | 261/111 |
| 1,564,075 | 12/1925 | Lakin | 261/111 X |
| 2,016,068 | 10/1935 | Fisher | 261/111 |
| 3,100,810 | 8/1963 | Meyer | 261/115 |
| 3,179,252 | 4/1965 | Vrablik | 210/44 X |
| 3,529,941 | 9/1970 | Fabiassen et al. | 261/115 X |

FOREIGN PATENT DOCUMENTS 637313 10/1936 Fed. Rep. of Germany ............ 55/188

OTHER PUBLICATIONS

Eimco Corporation Drawing, "Retention Tank", Drawing No. 111355.

*Primary Examiner*—Robert H. Spitzer
*Attorney, Agent, or Firm*—Robert E. Krebs; Thomas S. MacDonald

[57] ABSTRACT

A dissolving tank for dissolving a large amount of gas in a liquid and including a generally horizontally disposed tray (28) (29) mounted within the tank (2) (21) to divide the tank (2) (21) into an upper reaction zone (36) and a lower discharge zone (38). The tray (28) (29) has formed therein both a central opening (34) (35) for fluid communication between the discharge zone (38) and the reaction zone (36) and peripheral openings (32) (33) which allow any liquid which collects on the tray (28) (29) to flow from reaction zone (36) to discharge zone (38). The dissolving tank further includes liquid feed means (10) positioned within the tank (2) (21) below the tray (28) (29) to discharge liquid upwardly through the central opening (34) (35) of the tray (28) (29) and into the reaction zone (36). The dissolving tank further includes liquid distribution means (14) mounted within the tank (2) (21) above the tray (28) (29) and having flared sidewalls (15) and a vertically-oriented distribution orifice (16). The distribution means (14) is positioned so that a portion of the liquid discharged upwardly from the feed means (10) impacts on the flared sidewalls (15) and is distributed as droplets within the reaction zone (36) and another portion of the liquid discharged from the feed means (10) passes upwardly through the distribution orifice (16) toward the top (3) of the tank (2) (21).

9 Claims, 5 Drawing Figures

GAS-LIQUID DISSOLVING TANK

BACKGROUND OF THE INVENTION

1. Field of the Invention

This invention relates to an improved apparatus for continuously dissolving gas in a liquid and, more particularly, to a pressurized device to dissolve gas in a liquid.

2. State-of-the-Art

In various wastewater treatment processes, such as the well-known dissolved air flotation process (DAF), it is required that gas be dissolved in a liquid. In a DAF process, such as described in U.S. Pat. No. 3,179,252, gas bubbles are released when a super-atmospheric liquid-gas solution is depressurized in an open tank; the released bubbles then associate with solids in the liquid and carry them to the surface. It should be appreciated that the efficiency of this type of process depends, in part, upon the quantity of pressurized gas which can be dissolved in a given amount of liquid.

One conventional type of dissolving apparatus includes means for contacting a gas and a liquid in a pressurized tank. In this type of device, liquid and compressed gas, usually air, are simultaneously introduced to a pressurized reaction zone. Such devices are based upon the hypothesis that the quantity of gas which can be dissolved in a liquid at a given temperature and pressure depends primarily on the amount of liquid surface area exposed to the gas and on the duration of the gas-liquid contact time. Typically, such devices incorporate a feed nozzle to spray liquid against a splash plate in the reaction zone to create liquid droplets; the droplets then contact, and dissolve gas injected into the reaction zone. A device of this type is taught in U.S. Pat. No. 3,100,810.

SUMMARY AND OBJECTS OF THE INVENTION

A primary object of the present invention is to provide an improved apparatus for continuously dissolving gas in a liquid, which apparatus increases the liquid surface area available to the gas and the duration of the gas-liquid contact while requiring low energy input and little maintenance.

Briefly, the present invention accomplishes the above objective by providing a sealed tank having gas feed means, a novel "opposed-nozzle" liquid feed assembly for distributing liquid droplets into an upper reaction zone in the pressure tank, and a liquid "hold-up" means for prolonging gas-liquid contact in the tank.

Further understanding of the present invention will be gained by reference to the following description and to the drawings, which are offered by way of illustration only and not in limitation of the invention, the scope of which is defined by the appended claims and equivalents to the structure, materials and steps recited therein.

DESCRIPTION OF THE PREFERRED EMBODIMENT

Figure 1:
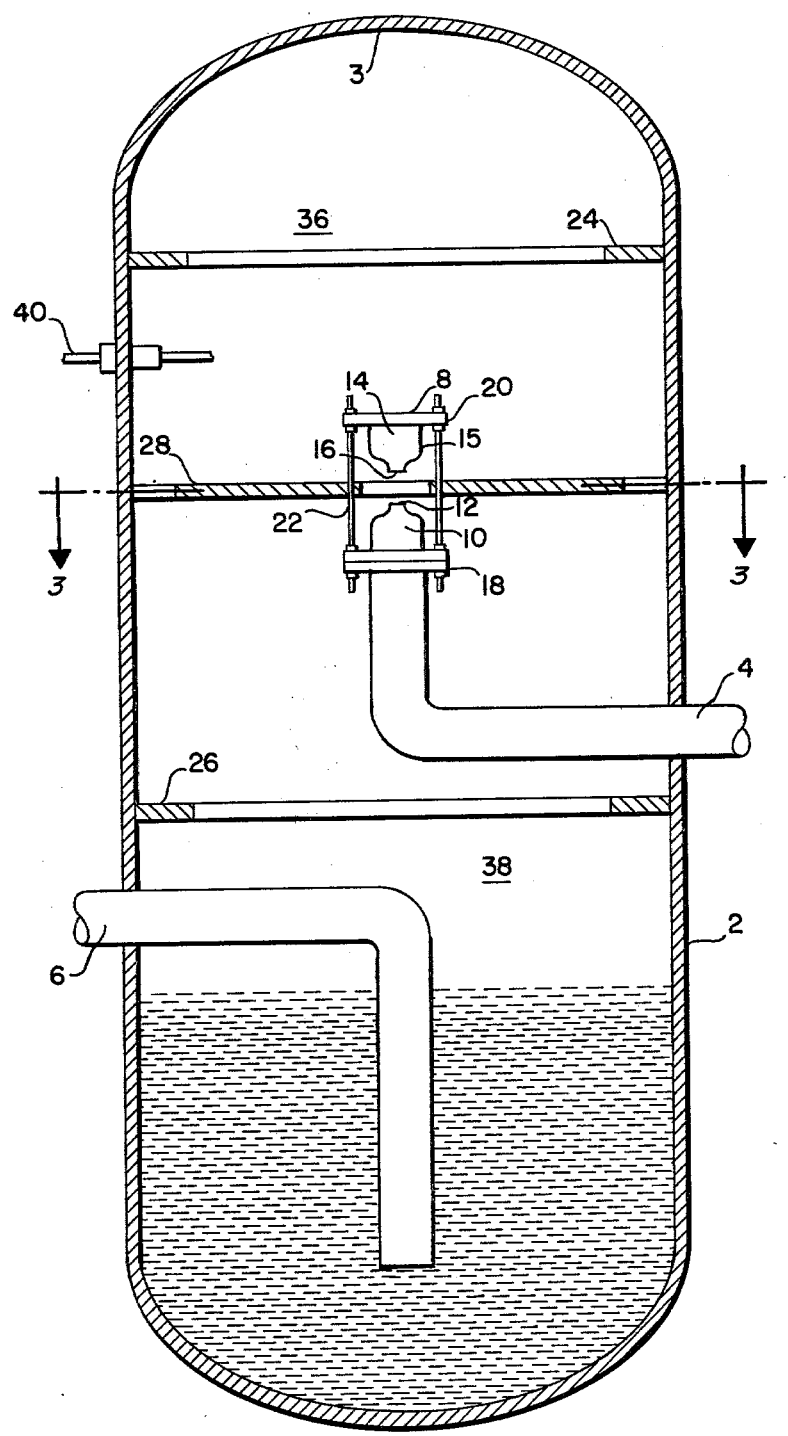
FIG. 1 is an elevational view of an apparatus according to the present invention.

The high-efficiency gas-liquid dissolving apparatus illustrated in FIG. 1 comprises a cylindrical pressure tank 2 having a curved top 3, an inlet pipe 4 for introducing liquid into the tank, and an outlet pipe 6 for discharging liquid containing dissolved gas from the tank. In the illustrated embodiment, inlet pipe 4 is in communication with the interior of the tank through the tank sidewall, and the distal end of inlet pipe 4 is vertically oriented and located coaxially with the centerline of the tank to discharge liquid upwardly through a feed nozzle assembly 8.

Figure 2:
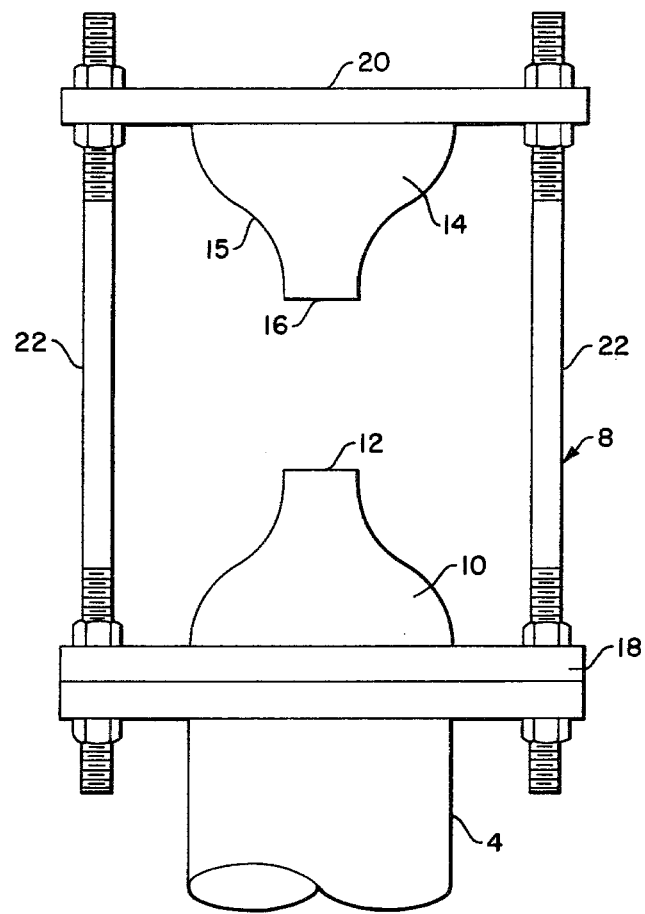
FIG. 2 is a detail elevation of a feed nozzle assembly for the apparatus of FIG. 1, drawn in enlarged scale for purposes of clarity.

As shown in FIGS. 1 and 2, the feed nozzle assembly 8 includes a feed nozzle 10 having a feed orifice 12 and a distribution nozzle 14 having a generally flaring sidewall 15 and a single distribution orifice 16. In the preferred embodiment, both feed nozzle 10 and distribution nozzle 14 are standard pipe reducer fittings mounted on flanges 18 and 20, respectively. Feed nozzle 10 and distribution nozzle 14 are connected by adjustable rods 22 which extend between the mounting flanges. The vertical center lines of feed orifice 12 and distribution orifice 16 are aligned one with the other and with the vertical center line of the upwardly-extending section of inlet pipe 4. While precise alignment is preferred, it is not critical to the invention.

Secured about the interior sidewall of tank 2 near its top is a first generally-horizontally disposed annular shelf 24. A second such annular shelf 26, which may be of different dimensions than those of shelf 24, is secured to the interior sidewall of tank 2 at a position lower than that of shelf 24. Secured to the interior sidewall of tank 2 between shelves 24 and 26 is liquid hold-up tray 28.

Figure 3:
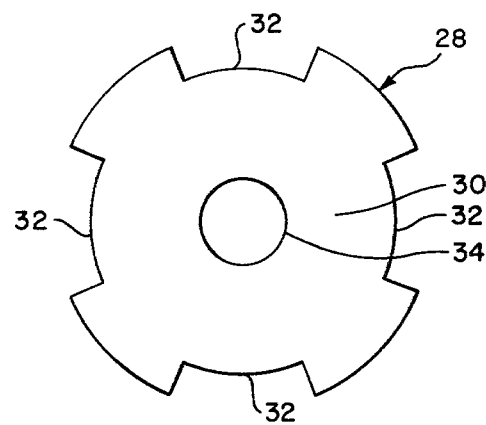
FIG. 3 is a plan view of the liquid hold-up tray for the apparatus of FIG. 1, also drawn in enlarged scale for purposes of clarity.

As shown in FIGS. 1 and 3, the liquid hold-up tray 28 comprises a generally horizontally disposed plate 30 having peripheral openings 32 and a circular center opening 34 formed therein. The horizontal plane of center opening 34 is located between feed orifice 12 and distribution orifice 16. The vertical center lines of both feed orifice 12 and distribution orifice 16 are aligned with the vertical axis of center opening 34. Again, this alignment is preferred but is not critical to the invention. As so positioned, liquid hold-up tray 28 divides the interior of tank 2 into an upper reaction zone 36 and a lower discharge zone 38.

Mounted in flow communication with the interior of tank 2 above liquid hold-up tray 28 is gas feed conduit 40.

In operation, a liquid stream, usually laden with suspended solids, is pumped into pressure tank 2 through feed nozzle 10 via inlet pipe 4. Because feed orifice 12 is of reduced diameter relative to inlet pipe 4, the velocity of the liquid stream is increased substantially as it exits feed nozzle 10. As stated above, feed nozzle 10 is preferably a standard pipe reducer. The use of a pipe reducers has several advantages over the use of conventional spray nozzles. Because the feed orifice of a pipe reducer is unrestricted in comparison with the slotted outlet ports of conventional spray nozzles, the present invention requires comparatively low feed pump horsepower. In addition, maintenance requirements are reduced because the orifice of the pipe reducer will not become clogged with solids from the feed liquid as would conventional spray nozzles.

The liquid stream exiting feed nozzle 10, due to its increased velocity, passes upward through the center opening 34 of liquid hold-up tray 28. A portion of this liquid stream impinges on the flaring sidewall 15 of distribution nozzle 14 and is distributed radially throughout the gas-liquid reaction zone 36 in the form of liquid droplets. The remaining portion of the liquid exiting feed nozzle 10 passes directly through distribution orifice 16 of distribution nozzle 14. Distribution nozzle 14 is adjustable relative to feed nozzle 10 via adjustable rods 22 so that the dispersion of liquid droplets in reaction zone 36 can be maximized. The velocity of the liquid that flows through distribution orifice 16 is such that this portion of the feed liquid impinges on the curved top 3 of pressure tank 2. Due to this curvature, a portion of the liquid impinging on the top of tank 2 flows downward along the side walls of tank 2 until it contacts annular shelf 24. The liquid then flows across shelf 24 and is directed toward the center of reaction zone 36 in the form of droplets as it flows over the edge of shelf 24. In this manner a large number of liquid droplets are formed in reaction zone 36. These droplets are contacted with gas, usually air, which has been admitted under pressure, normally 70 psig, to reaction zone 36 through gas feed conduit 40.

The liquid droplets thusly created in reaction zone 36 are prevented from falling directly into discharge zone 38 by liquid hold-up tray 28 which collects a large percentage of these falling droplets. The liquid collecting on plate 30 flows toward either center opening 34 or peripheral openings 32. Center opening 34 is sized such that liquid flowing from reaction zone 35 to discharge zone 38 through center opening 34 becomes entrained in feed liquid discharging upwardly from feed nozzle 10 and is reintroduced to reaction zone 36 as it flows upward at high velocity through center opening 34. Thus, downflowing liquid is recirculated to reaction zone 36 under turbulent conditions to provide an additional period of gas-liquid contact.

The liquid that eventually exits reaction zone 36 to enter discharge zone 38 does so by flowing through peripheral openings 32. While in the preferred embodiment, openings 32 are located at the perimeter of plate 30, it is noted that these "peripheral" openings could be located anywhere in plate 30 near its periphery. Openings 32 are sized to prevent solids buildup on plate 30 and, at the same time, to maintain liquid residence time in reaction zone 36 sufficient to efficiently dissolve a maximal amount of gas in the liquid.

In the preferred embodiment, the liquid entering discharge zone 38 flows through openings 32 and down the interior wall of tank 2. This liquid contacts and flows over the edge of annular shelf 26 to be distributed in lower zone 38 as liquid droplets. Thus, an additional opportunity for gas-liquid contact is provided in discharge zone 38.

The liquid containing dissolved gas then exits pressure tank 2 through outlet pipe 6 and is directed to a typical dissolved air flotation cell or the like.

Figure 4:
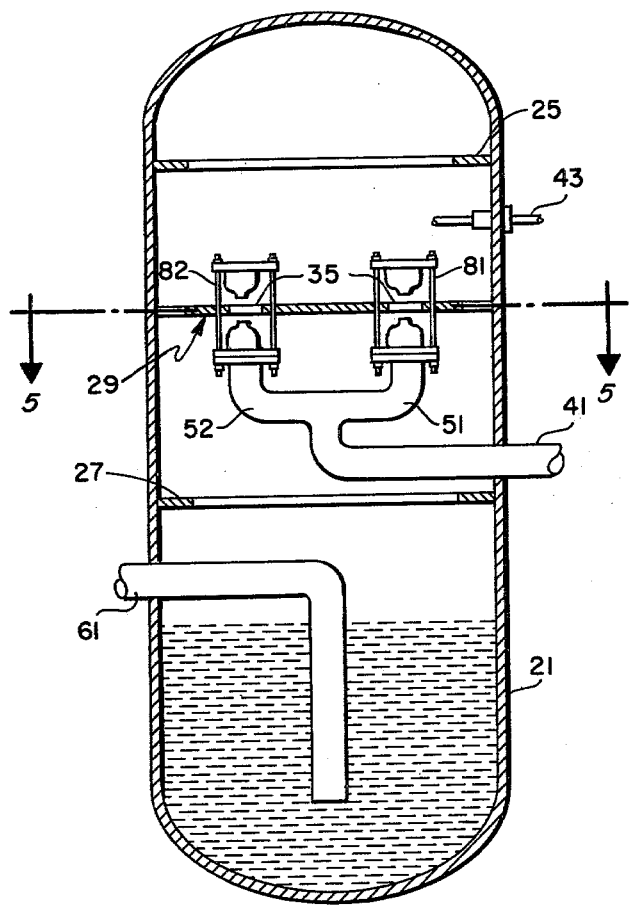
FIG. 4 is an elevation of an alternative embodiment of the apparatus according to the present invention.

Referring now to FIG. 4, there is shown a machine which operates in basically the same manner as the above-described apparatus but which differs structurally in that it includes a plurality of feed nozzle assemblies of the type shown in FIG. 2. More particularly, two such feed nozzle assemblies 81 and 82 are utilized in the machine of FIG. 4. It should be understood that the number of feed nozzles assemblies utilized is a matter of choice and that the inlet piping 41 is designed to accommodate the number of assemblies being used. In the embodiment of FIG. 4, inlet piping 41 includes two branches 51 and 52 which are in flow communication with assemblies 81 and 82 respectively. Assemblies 81 and 82 are positioned such that liquid exiting therefrom is discharged upwardly into pressurized tank 21 for contact with gas introduced via gas feed conduit 43.

Secured to the interior side of the pressure tank 21 are two generally horizontally disposed annular shelves 25 and 27 as shown in FIG. 4.

Figure 5:
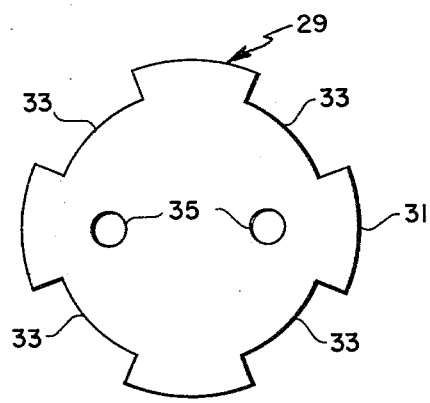
FIG. 5 is a plan view of the liquid hold-up tray for usage in the apparatus of FIG. 4.

Secured to the interior side of tank 21 between shelves 25 and 27 is liquid hold-up tray 29. Liquid hold-up tray 29 divides tank 21 into an upper reaction zone and a lower discharge zone in a configuration like that of reaction zone 36 and discharge zone 38 shown in the embodiment of FIG. 1. As shown in FIG. 5, liquid hold-up tray 29 comprises a generally horizontally disposed plate 31 having peripheral openings 33 and one or more medial (non-peripheral) openings 35 formed therein; the medial openings are sized to permit liquid exiting the feed orifices of feed nozzle assemblies 81 and 82 to pass upwardly into the reaction zone of the tank. It should be understood that one large opening 35 or a plurality of smaller openings, each associated with one of the feed nozzle assemblies, could also be used. For example, in the embodiment shown in FIG. 4, hold-up tray 29 has two openings 35 formed therein; one opening 35 is associated with assembly 81 and the other opening 35 is associated with assembly 82. The important feature is that the horizontal plane of the opening (or openings) 35 be located such that the liquid exiting the feed orifice of each feed nozzle assembly can pass upwardly through the opening and into the reaction zone of the tank.

We claim:

1. In an apparatus for continuously dissolving gas in a liquid, which apparatus includes a sealed tank, means for introducing gas under pressure into the tank, means for introducing liquid under pressure into the tank and means for discharging liquid containing dissolved gas from the tank, the improvement comprising:

a. a generally horizontally-disposed tray fixedly mounted within the tank to divide the tank into an upper reaction zone and a lower discharge zone, said tray having communication means formed centrally therethrough for fluid flow communication between said discharge zone and said reaction zone said tray also having formed therein at least one peripheral opening to allow liquid which collects on said tray to flow from said reaction zone to said discharge zone;

b. liquid feed means connected in flow communication with the liquid introduction means and positioned below said tray to discharge liquid upwardly through said communication means into said reaction zone past said tray such that liquid flowing from said reaction zone to said discharge zone through said communication means becomes entrained in said upwardly discharging liquid and is reintroduced to said reaction zone;

c. liquid distribution means mounted within the tank at a location spaced above said tray, said distribution means having flared sidewalls and a vertically-oriented distribution orifice formed therein, said distribution means being positioned so that a portion of the liquid discharging upwardly from said feed means impacts on said flared sidewalls and is thereby distributed as droplets within said reaction zone and another portion of the liquid discharging from said feed means passes upwardly through said distribution orifice toward the top of the tank.

2. Apparatus according to claim 1, said apparatus further comprising a first generally horizontally disposed annular shelf fixedly mounted to the interior sidewall of the tank above said tray so that any liquid collecting on said first shelf flows across said first shelf toward the center of the tank to be distributed in said reaction zone as liquid droplets.

3. Apparatus according to claim 2, said apparatus further comprising a second generally horizontally disposed annular shelf fixedly mounted to the interior sidewall of the tank below said tray so that any liquid collecting on said second shelf flows across said second shelf toward the center of the tank to be distributed in said discharge zone as liquid droplets.

4. Apparatus according to claim 3, said apparatus further comprising a plurality of vertically oriented connecting rods each of said rods attached at its lower end to said feed means and at its upper end to said distribution means, said rods being adjustable so that the distance between said feed means and said distributions means may be varied.

5. In an apparatus for continuously dissolving gas in a liquid, which apparatus includes a sealed tank, means for introducing gas under pressure into the tank, means for introducing liquid under pressure into the tank and means for discharging liquid containing dissolved gas from the tank, the improvement comprising:
 a. a generally horizontally-disposed tray fixedly mounted within the tank to divide the tank into an upper reaction zone and a lower discharge zone said tray having formed therein a central opening for fluid flow communication between said discharge zone and said reaction zone, said tray also having formed therein at least one peripheral opening to allow liquid which collects on said tray to flow from said reaction zone to said discharge zone;
 b. a liquid feed nozzle connected in flow communication with the liquid introduction means and having formed therein a feed orifice positioned below said tray and centrally relative to the tank to discharge liquid upwardly through said central opening into said reaction zone past said tray such that liquid flowing from said reaction zone to said discharge zone through said central opening becomes entrained in the liquid discharging upwardly from said liquid feed nozzle and is reintroduced to said reaction zone;
 c. a liquid distribution nozzle fixedly mounted above said liquid feed nozzle, and having flared sidewalls and a single downwardly-directed distribution orifice, said distribution nozzle positioned so that a portion of the liquid discharged from said feed nozzle impacts on said flared sidewalls and is distributed as droplets within said reaction zone and another portion of the liquid discharged from said feed nozzle passes upwardly through said distribution orifice toward the top of the tank.

6. Apparatus according to claim 5, said apparatus further comprising a first generally horizontally disposed annular shelf fixedly mounted to the interior sidewall of the tank above said tray so that any liquid collecting on said first shelf flows across said first shelf toward the center of the tank to be distributed in said reaction zone as liquid droplets.

7. Apparatus according to claim 6, said apparatus further comprising a second generally horizontally disposed annular shelf fixedly mounted to the interior sidewall of the tank below said tray so that liquid collecting on said second shelf flows across said second shelf toward the center of the tank to be distributed in said discharge zone as liquid droplets.

8. Apparatus according to claim 7, said apparatus further comprising a plurality of vertically oriented connecting rods each of said rods attached at its lower end to said feed means and at its upper end to said distribution means, said rods being adjustable so that the distance between said feed means and said distribution means may be varied.

9. In an apparatus for continuously dissolving gas in a liquid, which apparatus includes a sealed tank, means for introducing gas under pressure into the tank, means for discharging liquid containing dissolved gas from the tank, the improvement comprising:
 a. a generally horizontally-disposed tray fixedly mounted within the tank to divide the tank into an upper reaction zone and a lower discharge zone, said tray having formed therein means for fluid flow communication between said discharge zone and said reaction zone, said tray also having formed therein at least one peripheral opening to allow liquid collecting on said tray to pass from said reaction zone to said discharge zone;
 b. a plurality of liquid feed nozzles connected in flow communication with the liquid introduction means each of said nozzles having formed therein a feed orifice positioned to discharge liquid upwardly through said positioned to discharge liquid upwardly through said communication means into said reaction zone past said tray such that liquid flowing from said reaction zone to said discharge zone through said communication means becomes entrained in said upwardly discharging liquid and is reintroduced to said reaction zone;
 c. a plurality of liquid distribution nozzles equal in number to the number of said liquid feed nozzles, each of said distribution nozzles having upwardly curved sidewalls and a vertically-oriented distribution orifice and fixedly mounted in relation to said feed nozzles so that one distribution nozzle is positioned above a single corresponding feed nozzle such that a portion of the liquid discharged from said corresponding feed nozzle impacts on said curved sidewalls of said distribution nozzle and is distributed as droplets within said reaction zone and another portion of the liquid discharged from said corresponding feed nozzle passes upwardly through said corresponding distribution orifice toward the top of the tank.

* * * * *